Oct. 16, 1945.　　　J. P. DESMET　　　2,386,939
RIVET APPLYING TOOL
Filed March 27, 1943　　　2 Sheets-Sheet 1
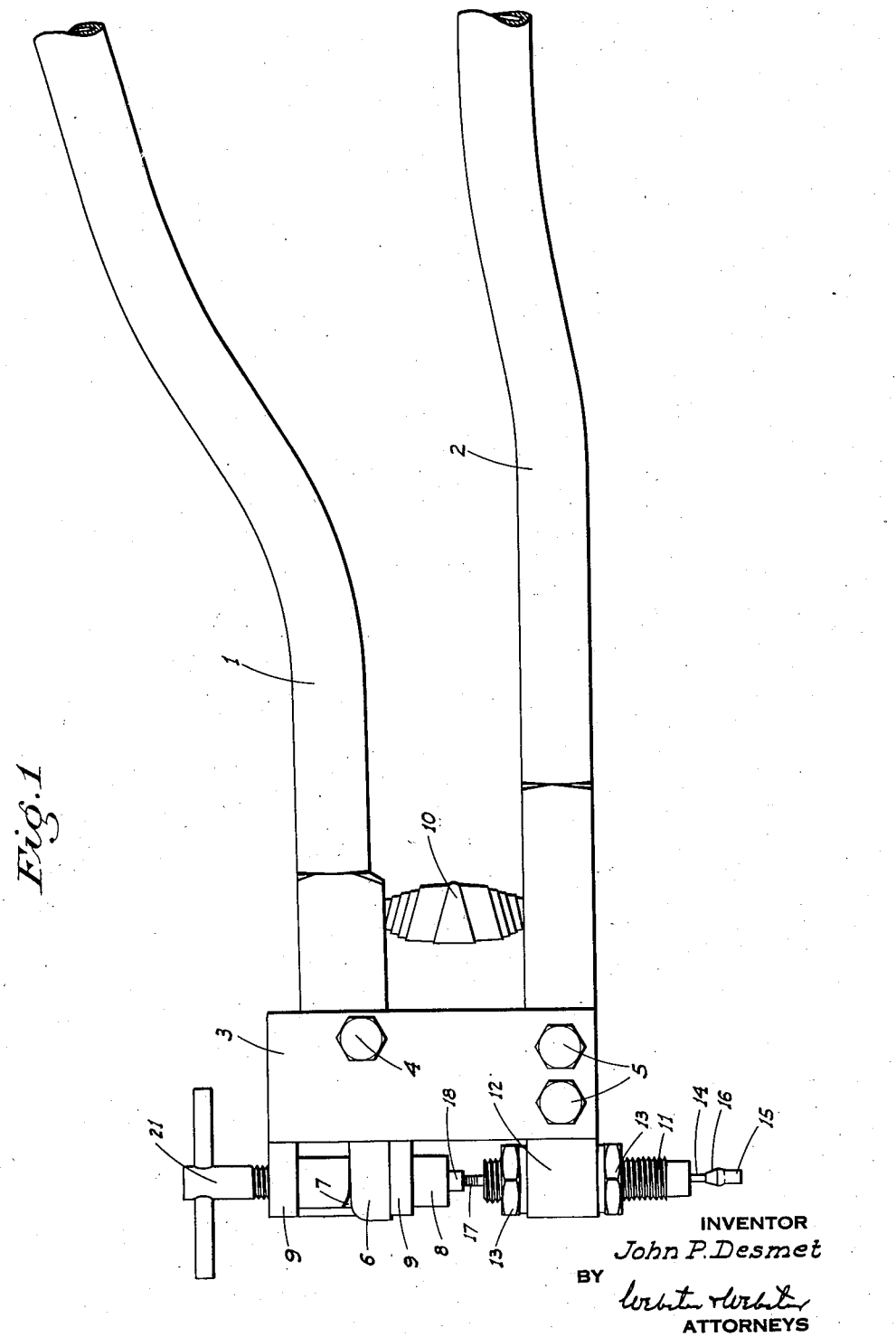
INVENTOR
John P. Desmet
BY
ATTORNEYS Oct. 16, 1945.  J. P. DESMET  2,386,939
RIVET APPLYING TOOL
Filed March 27, 1943  2 Sheets-Sheet 2
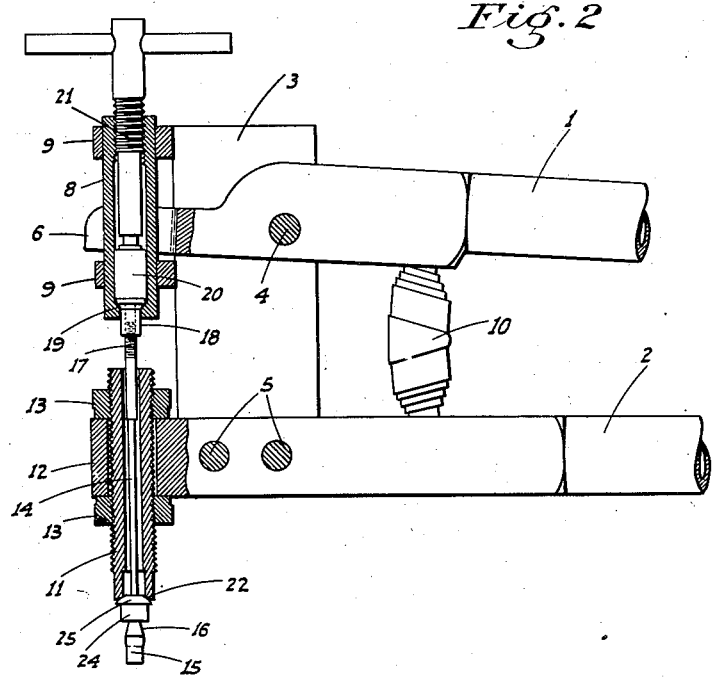
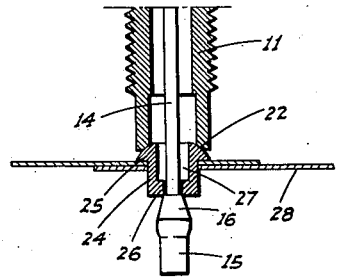
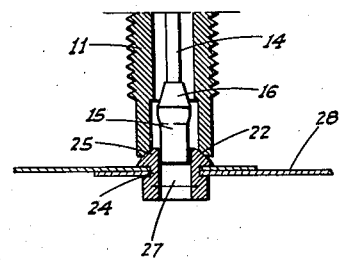
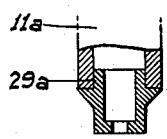
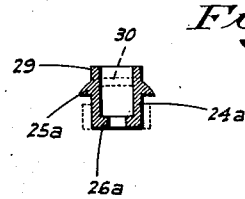
INVENTOR
John P. Desmet
BY
ATTORNEYS Patented Oct. 16, 1945

2,386,939

UNITED STATES PATENT OFFICE 2,386,939

RIVET APPLYING TOOL

John P. Desmet, Modesto, Calif.

Application March 27, 1943, Serial No. 480,779

5 Claims. (Cl. 218—19)

This invention relates generally to an improved rivet and a unique tool for applying the same to the work; the rivet being of the so-called blind type as used particularly in the aircraft industry, and while designed primarily for this purpose the rivet obviously is adaptable for many other uses.

One of the objects of the instant invention is to provide a rivet of the type described which can be applied quickly and easily and when in place functions to not only clamp the work together, but also certain diametral expansion of the rivet takes up any tolerance or looseness which may have initially existed about the shank of the rivet when placed in the rivet receiving hole in the work.

A further object of this invention is to provide a rivet, of readily deformable light-weight metal, which comprises a tubular shank having an enlarged head formed on one end thereof, the opposite end portion of the shank including an internal annular shoulder which reduces the diameter of the shank bore at said end for positive engagement by the deforming mandrel, whereby with advance of said mandrel axially into engagement with the rivet the portion of said shank between the shoulder and the work folds or is upset radially outwardly against the work, whereupon the shoulder portion is expanded and forcefully engaged with said folded portion of the shank, completing the riveting operation.

A still further object of this invention is to provide a tool of unique design arranged to apply blind rivets, of the type described, from exteriorally of the work, while accomplishing an effective deformation of the rivet at its inner end portion and against the inner surface of said work. The tool includes in combination with a plunger, an axial pull rod connected thereto, a rivet deforming mandrel mounted on the outer end of said pull rod, and a fixed annular die surrounding the rod between the mandrel and plunger; said rod being adapted to extend through a tubular rivet with the mandrel engaging the inner end of the rivet and the die engaging the other or outer end thereof.

An additional object is to provide a rivet applying tool, as in the preceding paragraph, in which said tool includes a pair of handles, one handle being pivotally connected with the other for swinging movement relative thereto; said one handle being operative to move the plunger axially to and fro, and the sleeve which forms the die being adjustably but normally fixed in connection with the other handle and axially alined but spaced from said plunger.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the rivet applying tool.

Figure 2 is a fragmentary side elevation partly in section of said tool.

Figure 3 is an enlarged fragmentary sectional elevation of the die mandrel and pull rod of the tool as in engagement with a rivet seated in the work but before deformation of said rivet.

Figure 4 is a similar view, but illustrates the rivet as deformed by the mandrel.

Figure 5 is an enlarged cross section of a modified form of the rivet.

Figure 6 is an enlarged section of another standard type of rivet formed with the modified feature of Figure 5.

Referring now more particularly to the characters of reference on the drawings, the numerals 1 and 2 indicate the two handles or grips of the tool, said handles adjacent one end extending in spaced relation between a pair of parallel plates 3; the handle 1 being pivotally connected between said plates by a cap screw 4, whereas the handle 2 is fixed between said plates by cap screws 5. It will thus be seen that the handle 1 can swing relative to handle 2 about the axis of the cap screw 4.

The handle 1 is formed with a fork 6 which projects beyond the plates 3 in a direction opposite the handle, said fork riding in transverse grooves 7 in opposite sides of a tubular plunger 8 which extends in slidable and guided relation in guides 9 fixed in connection with and projecting outwardly from the plates 3. By this construction the plunger cannot escape from the fork and is actuated axially to and fro by corresponding swinging movement of the handle 1. A compression spring 10 mounted between the handles 1 and 2 normally maintains said handles spaced to maximum extent and the plunger 8 advanced.

A sleeve or nipple 11 extends in axial alinement with the plunger through an extension 12 of the handle 2; said sleeve being threaded and normally held in fixed but axially adjustable relation by lock nuts 13.

A pull rod 14 extends through the sleeve 11 and beyond the outer end of said sleeve is fitted with a rivet deforming mandrel 15 which comprises a relatively small cylindrical body tapered at its inner end as at 16.

At the end opposite the mandrel 15 the rod is detachably connected to said plunger 8 in the following manner:

The inner end of the pull rod is threaded, as at 17, into a neck 18 formed integral with an enlarged head 19 having a taper face adjacent said neck. The tubular plunger 8 is reduced in diameter somewhat at its inner end and shaped to matchingly receive said tapered head; the neck projecting from said end of the plunger in initially loose play relation. A follower 20 is slidable in the plunger 8 and engages the head 19, said follower normally being forcefully engaged against said head by a thumb screw 21 threaded into the plunger from its other end.

The outer end of the sleeve 11, i. e. the end adjacent the mandrel 15, is formed as an annular concave rivet head seat or die 22, having an internal diameter greater than the outside diameter of the mandrel.

The improved rivet is shown in its initial form in Fig. 3, and such rivet, which is of deformable metal, comprises a tubular shank 24 formed on its outer end with an enlarged head 25. At its inner end the shank 24 is formed with an annular internal shoulder 26 which considerably reduces the diameter of the shank bore 27. The maximum diameter of said bore is slightly less than the diameter of the non-tapered portion of the mandrel.

In use, the rivet is applied by the tool in the following manner: The pull rod 14 is unthreaded from the neck 18 and withdrawn from the sleeve 11. Thereafter, the rivet is slipped over the pull rod inner end foremost, and the pull rod is then reinserted through the sleeve and threaded into the neck 18.

With the parts in this position the operator squeezes the handles together somewhat, drawing the mandrel relatively lightly against the inner end of the rivet and the head of the rivet against the die. The tool is then manipulated to insert the shank 24 of the rivet through matching holes previously formed in the plates or work 28 which are to be secured by said rivet; the shank 24 being inserted in said matching holes until the head 25 engages the outer surface of said work. Holding the tool and rivet in this position the operator further squeezes the handles together, which causes the fork 6 to retract the plunger relative to the sleeve 11. As a consequence the mandrel is forcefully drawn through the rivet from its inner end, effecting the following result:

As the mandrel begins to move axially outwardly, the portion of the shank between the shoulder 26 and the work 28 folds radially outwardly and against the work 28, whereupon the tapered portion 16 of the mandrel forces into the shoulder 26, expanding the latter and deforming it firmly against the previously folded portion of the shank. Continued movement of the mandrel pulls the same axially through the rivet, causing a certain amount of diametral expansion thereof, which takes up any tolerance or looseness which may have initially existed between the rivet shank and the work. Finally the mandrel is pulled entirely into the sleeve 11, and thence escaping from the head 25 of the rivet. This completes the riveting operation and the work about the rivet is firmly clamped together.

While the tool is here shown as hand actuated and for one-man operation, it can of course be modified, if necessity demands, for power actuation, as by compressed air.

In Fig. 5 the rivet includes the characteristics of the rivet shown in Figs. 3 and 4, namely a shank 24a, a head 25a, and a shouldered portion 26a. However, in this embodiment the rivet also includes a relatively short neck 29 which projects axially and outwardly from the head 25a. This form of the rivet is applied in exactly the same manner as the rivet shown in Figs. 3 and 4, but after application the neck 29 is spun inwardly to close the opening in the head 25a by a special tool (not here shown or described) which deforms said neck and forms a closure 30 for the opening. This neck may also be incorporated in a flush or "Exvex" type rivet, as shown at 29a in Fig. 6. If this type of rivet is to be used, the rivet heat seat 22 would be omitted from the tool sleeve 11a as shown, the sleeve fitting snugly over neck 29a.

Proper axial alinement of the pull rod 14 and neck 18 is accomplished upon tightening of the thumb screw 21, which causes the follower 20 to urge the taper head 19 tightly against the matching seat in the tubular plunger.

It will be noted that the base portion of the mandrel is slightly smaller than the taper portion 16; the latter rounding into the reduced size portion as shown. This provides proper clearance as the mandrel moves through the rivet; the rounding surface having a burnishing effect on the rivet bore. This reduced portion may be nurled for easier hand engagement if desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rivet applying tool for a tubular rivet, comprising a pair of handles, means connecting said handles in pivotal relation adjacent but short of one end thereof, guide means on said handle connecting means adjacent one handle, a plunger arranged for movement through said guide means, the longitudinal axis of said plunger being disposed in a plane intersecting the longitudinal axis of said one handle, means connecting said one handle to said plunger whereby to effect reciprocatory movement of the latter, a rivet engaging die on the other handle in substantially axial alinement with the plunger, a pull rod operatively connected with the inner end of such plunger and extending in the direction of and beyond the die, and a rivet deforming mandrel fixed to the outer end of said rod.

2. A rivet applying tool for a tubular rivet, comprising a pair of handles, a plate fixed to one handle, the other handle being pivoted to the plate in spaced relation to said first named handle, both handles at said one end thereof projecting beyond the plate, the projecting end of the pivoted handle being in the form of a fork, guide means on the plate, a plunger slidably movable through said guide means, such plunger being transversely grooved on opposite sides thereof, the forked ends of the pivot handle straddling the plunger and riding in said groove, a rivet engaging die on the end of the fixed handle, a pull rod connected with the plunger and extending toward and beyond the end of the die, and a rivet deforming mandrel fixed on the outer end of said rod.

3. A rivet applying tool as in claim 2 in which the plunger is tubular and of reduced diameter at its inner end, a threaded neck projecting out of the plunger through said inner end and in initially loose play relation, an enlarged tapered head on the neck within the plunger engaged in matching relation with the reduced diameter portion of the latter, the pull rod being threaded into said neck, and a thumb screw threaded into the plunger from its outer end and normally locking said head against said reduced diameter portion of the plunger.

4. A rivet applying tool for a tubular rivet comprising a first handle, a plate secured adjacent the outer end of the first handle, a second handle pivoted adjacent its outer end to said plate in spaced relation to the first handle, spaced guides mounted on the plate, a plunger mounted for reciprocating movement through the guides, and transverse grooves formed in the plunger on opposite sides thereof, the outer end of the second handle projecting beyond the plate and being in the form of a fork, the prongs of which straddle the plunger and engage in said grooves, a rivet engaging die on the end of the first handle, a pull rod connected with the inner end of the plunger and projecting toward and beyond the die, and a rivet deforming mandrel on the outer end of the rod.

5. A rivet applying tool for a tubular rivet, comprising a first handle having a relatively straight outer end, a substantially rectangular plate secured to the straight portion of said handle at a point slightly inwardly of the outer end thereof, a pair of spaced guides on the forward edge of said plate adjacent the outer end thereof, a plunger mounted in the guides for reciprocatory movement therein, a tubular rivet engaging die mounted on the end of the first handle in substantially axial alinement with the plunger, a pull rod connected with the inner end of the plunger and projecting through and beyond the die, a rivet deforming mandrel on the outer end of the rod, a second handle pivoted to the plate in spaced relation to the first handle, and means operatively connecting the second handle with the plunger whereby with the swinging movement of the second handle on its pivot the plunger will be reciprocated through said guides.

JOHN P. DESMET.